Oct. 5, 1965     T. C. GAMS     3,210,637
DIRECT CURRENT POWER SUPPLY CIRCUIT
Filed Dec. 20, 1961
FIG. 1
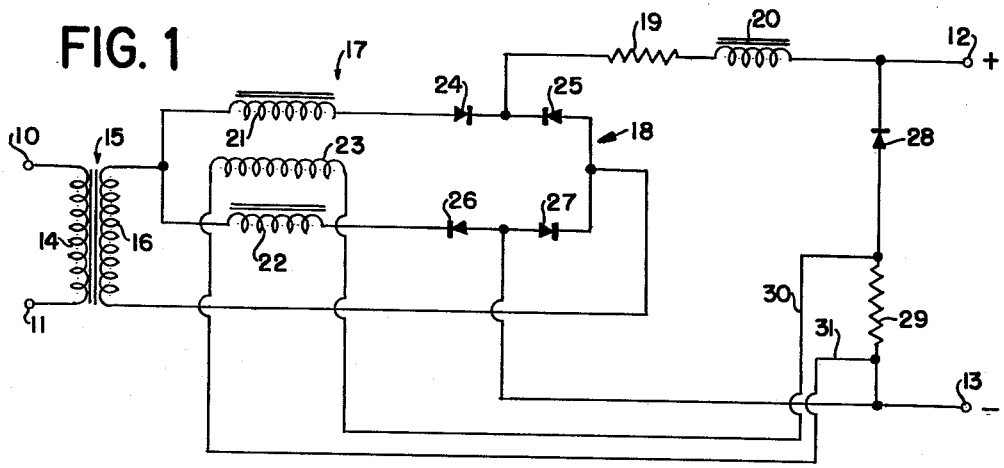
FIG. 2    FIG. 3    FIG. 4
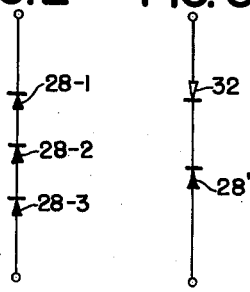
FIG. 5
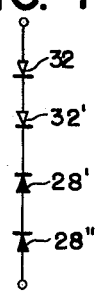
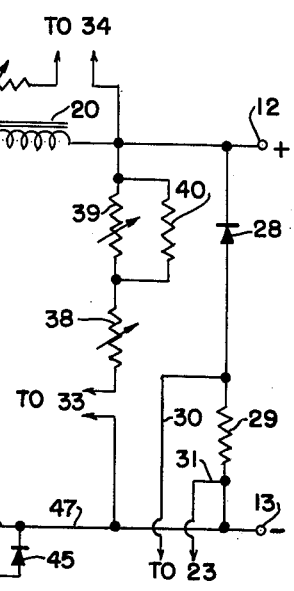
INVENTOR.
THEODORE C. GAMS
BY
*Darby & Darby*
ATTORNEYS

United States Patent Office 3,210,637
Patented Oct. 5, 1965

3,210,637
DIRECT CURRENT POWER SUPPLY CIRCUIT
Theodore C. Gams, Elizabeth, N.J., assignor to Varo, Inc.
Filed Dec. 20, 1961, Ser. No. 160,710
3 Claims. (Cl. 321—18)

This invention relates to direct current power supply circuits and more particularly to an improved direct current power supply circuit having novel means for regulating the output voltage thereof.

Although the direct current power supply circuit of the invention may be employed to provide direct current power at virtually any voltage and current level, it is especially useful in the relatively low voltage (0–300 volts) and current (0–50 amperes) range. Direct current power supplies in this output power range are utilized quite extensively in modern electronics circuits including, for example, the power supplies employed in digital and analog computers. For applications such as these, direct current power supply circuits should be rugged and reliable in operation. The reliability referred to does not only extend to the problem of fail-safe operation but also extends to the ability of the power supply to stay within the prescribed limits of operation. Accordingly, it is desirable to eliminate components such as transistors, vacuum tubes and capacitors from the power supply circuit for these applications.

In addition to the usual requirements of good dynamic voltage regulation and good static voltage regulation, the direct current power supplies used for many applications should function to protect the external circuitry connected to the output of the power supply from over-voltage surges, regardless of the type of failure that occurs. For some applications it is also important that the power supply be "fail-proof" under conditions in which the voltage across the output of the supply is accidentally reversed or is caused to rise by a misconnection of the external load circuit. These additional requirements are extremely important for application wherein the power supply circuits are used to supply complex electronic equipment, since the cost of such equipment may be many times the cost of the supply itself. Finally, power supply circuits should be of minimum size and weight and be relatively inexpensive to manufacture and replace.

In the aforesaid relatively low voltage-low current range of operation, four major types of direct current power supplies are in common use. The first type is the so-called "brute-force" semiconductor power supply which may be employed either with or without line-voltage regulating equipment preceding the rectifier-filter portion of the supply. This type of power supply achieves load regulation through "stiffness" only and exhibits a relatively low order of dynamic and static regulations. The second type of power supply in common use is the transistor-regulated power supply which utilizes semiconductor rectifiers followed by series or shunt regulating transistors which are driven by high-gain transistor amplifiers. In this type of supply, the voltage of a reference diode is continuously compared with the voltage output of the supply and the difference signal is utilized to correct the output voltage by varying the impedance of the regulating transistors. This type of supply may be readily converted to a constant-current rather than a constant-voltage supply by monitoring the voltage drop across a current shunt. Although this type of supply provides a high static regulation, it utilizes components such as transistors to effect the required high degree of amplification.

The third major group of power supplies is the magnetic amplifier type of supply which again utilizes semiconductor rectifiers and filters, but which also utilizes a magnetic amplifier or saturable reactor in the primary or secondary of the rectifier transformer to regulate the output voltage of the supply. Additionally, in many of these supplies a preamplifier stage comprising a high-gain magnetic amplifier is employed along with the usual reference voltage diode and comparison network. Unfortunately, for applications wherein the source of supply voltage is an alternating current voltage of relatively low frequency, such as the commercially available 60-cycle supply voltage, for example, the magnetic amplifier exhibits a very slow response time. Accordingly, this type of power supply circuit is mainly used for higher frequency work and in applications where a large amount of output power is required. The fourth major type of power supply in common use is a combination of the magnetic amplifier type and the transistor-regulated type. In this type, a fast, high-gain transistor amplifier is utilized to drive a relatively low-gain, fast-response magnetic amplifier which functions as the actual regulating unit. This combination achieves a response time somewhere between the transistor-regulated supply and the magnetic amplifier-regulated supply. Again, the dynamic regulation of such a unit is not at the most desirable level and the reliability of the device suffers from the use of transistors as the major regulating components.

Mention may also be made of the thyratron-regulated power supply circuits which are also used to some extent for low-voltage, high-current applications. This type of supply is limited in use however, by the relatively fragile and bulky package necessitated by the use of thermionic tubes.

From the foregoing review of the major types of power supplies in common use, it is evident that each type of supply possesses limitations, such as poor dynamic or static regulation, unreliability of components, fragility, or size and weight disadvantages.

Accordingly, it is an object of this invention to provide a direct current power supply circuit which is ultra-reliable in operation and which possesses optimum dynamic and static regulation characteristics.

It is an additional object of this invention to provide a direct current power supply circuit which is economical to manufacture and which is of a small size and weight compared to the presently known supplies.

It is a still further object of this invention to provide a direct current power supply circuit which is especially suited for "modular" packaging and which finds a wide application in complex electronic circuitry, such as electronic computer circuits, for example.

Briefly, the power supply circuit of the present invention utilizes non-linear impedance means, such as a Zener diode, for example, shunted across the output of the supply to provide the required high level of dynamic voltage regulation. The non-linear impedance means has a voltage-current characteristic such that the voltage drop across the device remains substantially constant over a wide range of current values so that the voltage output of the supply tends to remain substantially constant with variations in load and with line voltage variations. The present invention provides means for stabilizing or "freezing" the operating characteristics of the non-linear impedance device, so that a high degree of dynamic regulation is maintained at all times. This is accomplished by sensing the current flowing through the Zener diode, or other non-linear impedance, and maintaining it by means such as a magnetic amplifier, for example, at a level at which the internal dynamic impedance of the diode is at an optimum small value, to thereby secure an extremely fast response time for the regulator. Since the magnetic amplifier does not itself regulate the voltage at the output of the power supply, the inherent slow response time of the magnetic amplifier does not act to limit the overall response time of the regulator, so that a high order of dynamic regulation is obtained. The inherent reliability and accuracy of the magnetic amplifier is utilized, however, to provide a high order of "long-term" or static regulation, so that the power supply circuit of the invention exhibits highly reliable and stable operating characteristics.

The power supply circuit of the invention may also be provided with means for effecting temperature compensation, reverse-voltage protection and may include other protective features, if desired. All of these additional advantages, however, are secured without employing relatively unreliable components such as transistors, capacitors or thermionic tubes.

In the drawing:

FIG. 1 is a schematic circuit diagram of a direct current power supply circuit constructed in accordance with the teachings of the invention;

FIGS. 2, 3 and 4 are schematic circuit diagrams of various combinations of non-linear impedance elements which may be utilized as the non-linear impedance means in the circuit of FIG. 1; and FIG. 5 is a schematic circuit diagram of the direct current power supply circuit of the invention incorporating additional features, such as temperature compensation and current-limit protection, for example.

Referring now to FIG. 1 of the drawing, there is shown a direct current power supply circuit comprising input terminals 10 and 11 and output terminals 12 and 13. Input terminals 10 and 11 are connected to the primary winding 14 of a line transformer 15 which has a secondary winding 16. The transformer 15 may serve to raise or lower the level of the alternating current line voltage as applied to input terminals 10 and 11 and also serves to provide electrical isolation of the power supply circuit from the alternating current supply lines. Secondary winding 16 is connected to the output terminals 12 and 13 through a magnetic amplifier 17, a rectifier 18, a resistor 19 and a filter choke 20, so that a direct current voltage appears across the output terminals 12 and 13 with the polarity indicated on the drawing. Magnetic amplifier 17 is of a conventional "self-saturating" type and comprises output or "gate" windings 21 and 22 and a control winding 23. Rectifier 18 comprises diodes 24, 25, 26 and 27 which are preferably of the semi-conductor type and are arranged in a "bridge" circuit with the gate windings 21 and 22 of the magnetic amplifier. The resulting circuit constitutes a self-saturating type of magnetic amplifier which provides a direct current output, the magnitude of which is controlled by energization of the magnetic amplifier control winding 23 in the usual manner. The pulsating direct current output from the magnetic amplifier-rectifier circuit is passed through the resistor 19 and the inductance 20 to filter out the "ripple voltage" component. Resistance 19 may be the internal resistance of the filter choke 20 or may be a separate resistor depending upon the type of choke employed.

A non-linear impedance, such as the Zener diode 28 illustrated, is shunted across the output terminals 12 and 13 to regulate the output voltage appearing thereacross. The voltage-current characteristics of the Zener diode is such that the voltage drop across the diode remains substantially constant over a wide range of current values. The magnitude of the output voltage of the circuit is, of course, determined by the inherent constant voltage characteristic of the diode selected for the regulating element. The Zener diode 28 functions in the manner of a simple glow tube regulator to maintain the circuit output voltage constant over a wide range of current values. This is accomplished, however, by variations in the internal impedance presented by the non-linear impedance element, so that for long-term or static voltage correction, the internal impedance of the regulating element may be made quite large with a resulting increase in dynamic response time of the regulator.

The power supply circuit of the present invention provides means for freezing the internal impedance of the regulating element at an optimum value which insures a high level of dynamic response and regulation. This is accomplished by sensing the current flowing through the diode 28 by means of a resistor 29 and applying the resistor voltage drop which is then a measure of the current flow, to the control winding 23 of the magnetic amplifier by means of leads 30 and 31. The voltage applied to the control winding 23 of the magnetic amplifier permits the magnetic amplifier to maintain the current flowing through the diode 28 at a predetermined optimum value. This value of diode current is selected so that the diode exhibits the smallest internal dynamic impedance consistent with good operation. For example, if the internal impedance of the diode is permitted to become too small, the current flowing through the diode will become too large with the result that the diode may be damaged by overheating. In this regard, it may be noted that the resistance 19 should be large enough to limit the peak current in the Zener diode 28 to a safe value.

In operation, the internal dynamic impedance of the diode 28 is maintained at its small preselected value by the action of the magnetic amplifier 17 in controlling the amount of current passing through the diode. Because of this arrangement, the dynamic output impedance of the power supply is determined solely by the internal dynamic impedance of the Zener diode. This means that for dynamic regulation purposes, the response time of the magnetic amplifier is not important because the actual regulation of the voltage for "short-term" or transient changes is accomplished by the Zener diode itself. For long-term or static regulation, the magnetic amplifier controls the amount of current flowing through the Zener diode and maintains it at its preselected small value. Since the inherently long responce time of the magnetic amplifier is unimportant for static regulation purposes, it is apparent that the power supply circuit of the invention will exhibit the desired high degree of dynamic regulation permitted by non-linear impedance voltage regulation and yet obtain all the advantages of the excellent static voltage regulation obtained with magnetic amplifier operation. In the previously known power supply circuits hereinbefore discussed, magnetic amplifiers were employed to regulate the output voltage of the circuit directly, so that the response time of the magnetic amplifier in effect governed the dynamic regulation of the circuit. In the present arrangement, the magnetic amplifier does not regulate the output voltage of the circuit directly but instead regulates the current through the voltage-regulating diode 28, so that the response time of the magnetic amplifier does not control the dynamic regulation.

The present arrangement has an additional advantage of some importance in that it permits the diode 28 to act as a capacitor to filter out the ripple voltage from the output of the circuit. This filtering action arises because of the low internal dynamic impedance maintained in the Zener diode by the regulating action of the magnetic amplifier. Although the Zener diode has a high direct current impedance to prevent the supply from being overloaded, it has a low alternating current impedance to variations in the direct current output voltage. The low alternating current impedance or dynamic impedance of the diode permits it to act in the same manner as a capacitor shunting the output of the voltage supply circuit. Accordingly, the power supply circuit of the present invention eliminates the need for capacitors to insure a low ripple output voltage. Finally, it may also be noted that since diodes appear to always fail by short-circuiting, the external circuitry connected to the output of the power supply circuit is protected from over-voltage surges which may be caused by a misfunction or failure of the power supply circuit components This feature is extremely valuable for applications wherein the power supply circuit is employed in complex, expensive electronic equipment such as electronic computers, for example Although the non-linear impedance 28 has been illustrated as a Zener diode, it is apparent that other types of non-linear impedance elements may be employed. The element selected should, of course, possess a voltage-current characteristic having a "flat" constant voltage portion over a substantially wide range of current values. Inasmuch as the output voltage of the direct current power supply circuit of FIG. 1 is essentially the voltage of the non-linear impedance element, the element should also be selected to yield the proper output voltage at the specific current required. In turn, the specific current through the diode, or other non-linear element is related to its dynamic impedance, so that the current value should be selected to yield the lowest possible dynamic impedance consistent with proper operation of the element. Other non-linear elements which may be employed include varistors, forward-connected diodes, gas glow tubes and corona-discharge, voltage-regulating tubes. Additionally, by combining several non-linear impedance elements it is possible to obtain an overall operating characteristic for the group of elements which is superior or in some respects more desirable than the operating characteristic for a single element. For example, in FIG. 2 of the drawing the Zener diode 28 is shown as being replaced by a group of three Zener diodes 28–1, 28–2, and 28–3 connected in series circuit. Since the voltage drops of the series-connected Zener diodes are additive, a higher output voltage is also provided for the power supply circuit. Furthermore, it is possible to take off multiple voltage outputs at the intersections of the series-connected diodes in the manner of a voltage divider circuit.

FIG. 3 of the drawing illustrates how the non-linear impedance 28 in FIG. 1 of the drawing may be replaced by a series combination of a Zener diode 28' and a forward-connected diode 32. An arrangement of this nature permits the use of forward diodes to "trim" the voltages of unselected or poorly selected Zener diodes to obtain a more desirable overall characteristic curve. Similarly, FIG. 4 of the drawing illustrates a series combination of plural Zener diodes 28' and 28" and plural forward-connected diodes 32 and 32'. Accordingly, it is believed apparent that the non-linear impedance element employed to shunt the output terminals of the direct current power supply circuit of the invention may comprise one or more elements of a given type or combinations of elements of different types, depending upon the overall characteristics sought to be obtained.

It may also be noted that the remaining components of the power supply circuit of FIG. 1 of the drawing may be replaced by other components of different types. For example, the magnetic amplifier 17 could be replaced by controlled rectifiers or by a simple saturable reactor if desired. In addition, for some applications it may be more desirable to place the magnetic amplifier on the primary side of the input transformer 15. This arrangement may have a considerable advantage in the fact that a great many power supply designs could be combined utilizing only a single magnetic amplifier design. Similarly, controlled rectifiers could be employed on the primary side as well as the secondary side of the line transformer. The current sensing resistor 29 could be replaced by other current sensing impedances if desired and, in fact, could be eliminated completely by merely connecting the control winding 23 of the magnetic amplifier 17 directly in series circuit with the non-linear impedance element 28. This arrangement however, although possible, is not preferred because the resistor 29 acts as a damping resistor to reduce second harmonic distortion in the output of the power supply and further acts to keep the surge impedance of the path through the Zener diode 28 to a minimum.

It may be noted that the use of a Zener diode for the non-linear impedance element 28 automatically provides reverse-voltage protection for the power supply circuit because of the inherent nature of the Zener diode. Forward diodes, of course, do not provide such protection because their normally conducting direction is opposite that of a Zener diode when connected across the output terminals of the power supply. Should forward-connected diodes or other nonlinear impedance elements be employed which do not automatically provide reverse-voltage protection, another diode may be connected across the output terminals in the reverse direction to provide the required protection in an inexpensive manner.

FIG. 5 of the drawing shows the basic direct current power supply circuit of FIG. 1 of the drawing with added circuit refinements, some or all of which may be necessary or desirable in certain applications. In describing this circuit, the same reference numerals will be employed to designate those elements found in the basic circuit of FIG. 1. The circuit of FIG. 5 includes the line transformer 15, magnetic amplifier 17, rectifier 18, resistor 19, inductance 20, non-linear impedance element 28 and the current sensing resistor 29 of FIG. 1 of the drawing. In this circuit, however, the magnetic amplifier 17 is provided with additional control windings 33, 34, 35, 36 and 37 which control the output of the magnetic amplifier in accordance with certain circuit operating conditions. The magnetic amplifier control winding 23 is again connected across the current sensing resistor 29, as in the circuit of FIG. 1, and serves to control the magnitude of the current passing through the Zener diode 28.

Control winding 33 is connected in series circuit with variable resistors 38 and 39 across the output terminals 12 and 13 of the direct current power supply circuit in parallel with the shunt circuit containing the Zener diode 28. The circuit including control winding 33 performs the functions of establishing a bias level for the magnetic amplifier and providing temperature compensation for the Zener diode 28. Since the circuit including variable resistor 38 is connected across a substantially constant source of direct current voltage, an adjustment of resistor 38 may be made to set the magnitude of the direct current in winding 33, thereby establishing a bias level for the magnetic amplifier. This, of course, also sets the level of the steady state direct current through the Zener diode 28 to establish the set or predetermined value of the internal dynamic impedance of the diode as hereinbefore explained.

A thermistor 40 or other negative temperature coefficient resistor is connected across variable resistor 39 so that the magnitude of the direct current through control winding 33 is made dependent upon temperature. By placing the thermistor 40 in the immediate vicinity of, or, preferably, in contact with the Zener diode 28, the operation of the circuit may be made substantially independent of ambient temperature variations. The parallel circuit combination of variable resistor 39 and thermistor 40 may be set so as to "flat compound" the temperature range over which the Zener diode 28 must operate. For example, assuming that the Zener diode has a positive temperature coefficient and that the ambient temperature is raised, the Zener voltage will increase. The thermistor 40 senses the increase in temperature and acts through the control winding 33 of the magnetic amplifier to automatically decrease the Zener current to thereby maintain the dynamic impedance of the Zener diode at the optimum set value. Should the temperature decrease, the thermistor 40 causes the magnetic amplifier to increase the Zener current. By virtue of this arrangement, the direct current power supply circuit of the invention may be adapted for operation under severe temperature variation conditions.

Control winding 34 of magnetic amplifier 17 is connected in series circuit with a variable resistance 41 across the choke coil 20 and serves to sense the rate of change of current through the inductance 20 by sampling the voltage across the inductance. Should resistor 19 merely be the internal resistance of inductance 20, the control winding 34 and variable resistance 41 would be connected across both the inductance 20 and its internal resistance 19. The rate of change signal produced in control winding 34 is applied to magnetic amplifier 17 in such a sense and magnitude as to prevent oscillation due to capacitive loading. The large ripple component of the voltage across inductance 20 should not produce any sifinificant ripple current through control winding 34 because of its very high inductance and the high frequency of the ripple voltage. Variable resistor 41 serves to adjust the magnitude of the rate feedback produced.

Control winding 35 of magnetic amplifier 17 is employed to compensate the power supply circuit for excessive line voltage variations. Although the basic power supply circuit disclosed in FIG. 1 of the drawing already regulates well against line voltage variations by virtue of the action of control winding 23, additional compounding to yield an almost perfect regulation against line variations can be achieved by sampling the voltage across the secondary winding 16 of line transformer 15, rectifying it, and utilizing the resulting current to control the magnetic amplifier. To this end, control winding 35 is connected in series circuit with a diode 42 and a variable resistance 43 across a portion 44 of the secondary winding 16 of the line transformer. Since the voltage appearing across portion 44 of the secondary winding 16 is alternating current voltage, diode 42 serves to convert this voltage to half-wave direct current which is needed for operation of the magnetic amplifier control winding 35. It is, of course, possible by employing an additional rectifier and an additional tap on the secondary winding 16 to produce a full-wave direct current for control of the winding 35. However, since static compensation only is required, the half-wave circuit illustrated is adequate for most applications.

Magnetic amplifier control winding 36 is connected in series circuit with a Zener diode 45 across a variable resistance 46 which is located in output lead 47 of the power supply circuit. Winding 36 provides current-limit protection, so that both the power supply circuit itself and its load are protected against the possibility of excessive current during a short-circuit fault. The voltage drop across said variable resistor 46 represents the magnitude of the current supplied by the power supply circuit. This voltage is compared with a reference voltage drop across the Zener diode 45 to provide a control signal for operating the magnetic amplifier 17. When the voltage drop across variable resistance 46 exceeds the normal voltage drop across the diode 45, a relatively large increase in current is fed through the control winding 36 to sharply reduce the output voltage supplied to the load. When the overload or fault is removed, the output voltage is automatically returned to its normal value.

The direct current power supply circuit shown in FIG. 5 of the drawing also provides means for increasing the effective gain of the magnetic amplifier 17 by means of a simple regenerative feedback circuit. To this end, control winding 37 of the magnetic amplifier is connected in series circuit with a diode 48 and a variable resistance 49 across main gate winding 22 of the amplifier. This circuit monitors the voltage drop across gate winding 22 and acts to further collapse the gate voltage whenever it is reduced as a result of the action of one of the control windings. Variable resistance 49 is provided to vary the magnitude of the positive feedback signal induced in control winding 37 to thereby control the gain of the magnetic amplifier 17.

It is believed apparent from the foregoing description that many changes could be made in the described direct current power supply circuit and many seemingly different embodiments of the invention could be made without departing from the scope thereof. Accordingly, it is intended that all matter contained in the above description or shown in the accompanying drawing shall be interpreted as illustrative and not in a limiting sense.

What is claimed is:

1. In a direct current power supply circuit having an input adapted to be coupled to an alternating current supply voltage source, an output adapted to be coupled to a load, and rectifier means coupled between said input and said output for converting alternating current to pulsating direct current, the combination comprising a non-linear impedance shunted across said output, said impedance having a voltage-current characteristic exhibiting a substantially constant voltage drop over a wide range of current values; current control means for controlling the magnitude of the current through said non-linear impedance; current sensing means coupled to said non-linear impedance and to said current control means for causing said control means to maintain the magnitude of the current through said impedance at a predetermined value at which said non-linear impedance exhibits a small internal dynamic impedance to voltage variations across said circuit output; and condition sensing means coupled to said current control means for causing said control means to control the magnitude of the current through said impedance in response to an operating condition of said circuit, whereby said non-linear impedance functions to regulate the voltage across said circuit output with a high order of dynamic regulation and said current control means and said impedance combine to regulate the output voltage of said circuit with a high order of static regulation, wherein said condition sensing means comprises means for sensing the rate of change of the output current of the power supply circuit to provide rate feedback control for said current control means, so that instability of operation caused by capacitive loading is prevented.

2. In a direct current power supply circuit having an input adapted to be coupled to an alternating current supply voltage source, an output adapted to be coupled to a load, and rectifier means coupled between said input and said output for converting alternating current to pulsating direct current, the combination comprising a non-linear impedance shunted across said output, said impedance having a voltage-current characteristic exhibiting a substantially constant voltage drop over a wide range of current values; current control means for controlling the magnitude of the current through said non-linear impedance; current sensing means coupled to said non-linear impedance and to said current control means for causing said control means to maintain the magnitude of the current through said impedance at a predetermined value at which said non-linear impedance exhibits a small internal dynamic impedance to voltage variations across said circuit output; and condition sensing means coupled to said current control means for causing said control means to control the magnitude of the current through said impedance in response to an operating condition of said circuit, whereby said non-linear impedance functions to regulate the voltage across said circuit output with a high order of dynamic regulation and said current control means and said impedance combine to regulate the output voltage of said circuit with a high order of static regulation, wherein said condition sensing means comprises means for sensing the output of said current control means to provide positive feedback therefor, so that the effective gain of said current control means is thereby increased.

3. In a direct current power supply circuit having an input adapted to be coupled to an alternating current supply voltage source, an output adapted to be coupled to a load, and rectifier means coupled between said input and said output for converting alternating current to pulsating direct current, the combination comprising a non-linear impedance shunted across said output, said impedance having a voltage-current characteristic exhibiting a substantially constant voltage drop over a wide range of current values; current control means for controlling the magnitude of the current through said non-linear impedance; current sensing means coupled to said non-linear impedance and to said current control means for causing said control means to maintain the magnitude of the current through said impedance at a predetermined value at which said non-linear impedance exhibits a small internal dynamic impedance to voltage variations across said circuit output; and condition sensing means coupled to said current control means for causing said control means to control the magnitude of the current through said impedance in response to an operating condition of said circuit, whereby said non-linear impedance functions to regulate the voltage across said circuit output with a high order of dynamic regulation and said current control means and said impedance combine to regulate the output voltage of said circuit with a high order of static regulation, wherein said condition sensing means comprises means for sensing the temperature of said non-linear impedance, so that the voltage output of the power supply circuit is compensated with respect to temperature variations of said non-linear impedance, wherein said current control means comprises a magnetic amplifier and said temperature sensing means comprises a temperature responsive impedance serially connected with a control winding of said amplifier across the output of the power supply circuit, and wherein the series circuit of said temperature responsive impedance and said control winding includes a variable impedance for adjusting the bias level of said magnetic amplifier, to thereby adjust the said predetermined value of the current through said non-linear impedance.

References Cited by the Examiner

UNITED STATES PATENTS

| 2,751,545 | 6/56 | Chase | 321—18 |
| 2,751,549 | 6/56 | Chase | 321—18 |
| 2,983,863 | 5/61 | Keonjian | 323—69 |
| 2,999,227 | 9/61 | Hezel | 307—88.5 |
| 3,129,375 | 4/64 | Huntzinger | 321—18 |

FOREIGN PATENTS

| 232,418 | 2/61 | Australia. |

LLOYD McCOLLUM, *Primary Examiner.*